United States Patent [19]

Levy

[11] 3,892,755

[45] July 1, 1975

[54] PROCESS OF PREPARATION OF VINCAMINE FROM TABERSONINE

[75] Inventor: Jean Levy, Reims, France

[73] Assignee: Omnium Chimique Societe Anonyme, Brussels, Belgium

[22] Filed: Jan. 13, 1972

[21] Appl. No.: 217,580

[30] Foreign Application Priority Data

Mar. 3, 1971 Belgium ............................. 763730
Jan. 15, 1971 Belgium ............................. 761628

[52] U.S. Cl. ........................ 260/287 R; 260/289 A
[51] Int. Cl. ............................................. C07d 33/48
[58] Field of Search .............................. 260/287 R

[56] References Cited
UNITED STATES PATENTS

| | | | |
|---|---|---|---|
| 2,823,204 | 2/1958 | Janot et al. ...................... | 260/236 R |
| 3,205,220 | 9/1965 | Svoboda et al. ................. | 260/287 R |
| 3,562,289 | 2/1971 | Battista et al. ................... | 260/236 R |

FOREIGN PATENTS OR APPLICATIONS

| | | | |
|---|---|---|---|
| 2,004,853 | 3/1970 | France ........................... | 260/287 R |

OTHER PUBLICATIONS

Bylsma, Feik, "Dissertation Abstracts Int." B 1971, 31(11), 6495.

Journal of the American Chemical Society, Kutney et al., "Total Syn. of Indole . . . Alkaloids, Transannular Cyc. . . ." 92, 1970, p. 1700.
Ibid, pg. 1727, Kutney et al., "Total Synthesis of Indole Alkaloids".

*Primary Examiner*—Donald G. Daus
*Assistant Examiner*—David E. Wheeler
*Attorney, Agent, or Firm*—Pollock, Philpitt & Vande Sande

[57] ABSTRACT

A method of preparing (−) vincamine (5) which comprises: catalytically hydrogenating (−) tabersonine (1) to form (−) vincadifformine (2); oxidising (−) vincadifformine (2) with a peroxy-compound so as to form: (−) 1,2-dehydro-16-carbomethoxy-16-hydroxy-N-oxy-aspidospermidine (4); coversing the latter by molecular rearrangement in acid medium and in the presence of a reducing agent for N-oxy group so as to form a mixture of (−) vincamine (5), epi-16-vincamine (6) and apo-vincamine (7). If desired the (−) vincamine (5) is separated from the said mixture.

The tabersonine used is obtained from Voacanga grains preferably by method disclosed in French Pat. No. 69,09,002.

Also novel indoles and intermediate products.

15 Claims, 1 Drawing Figure

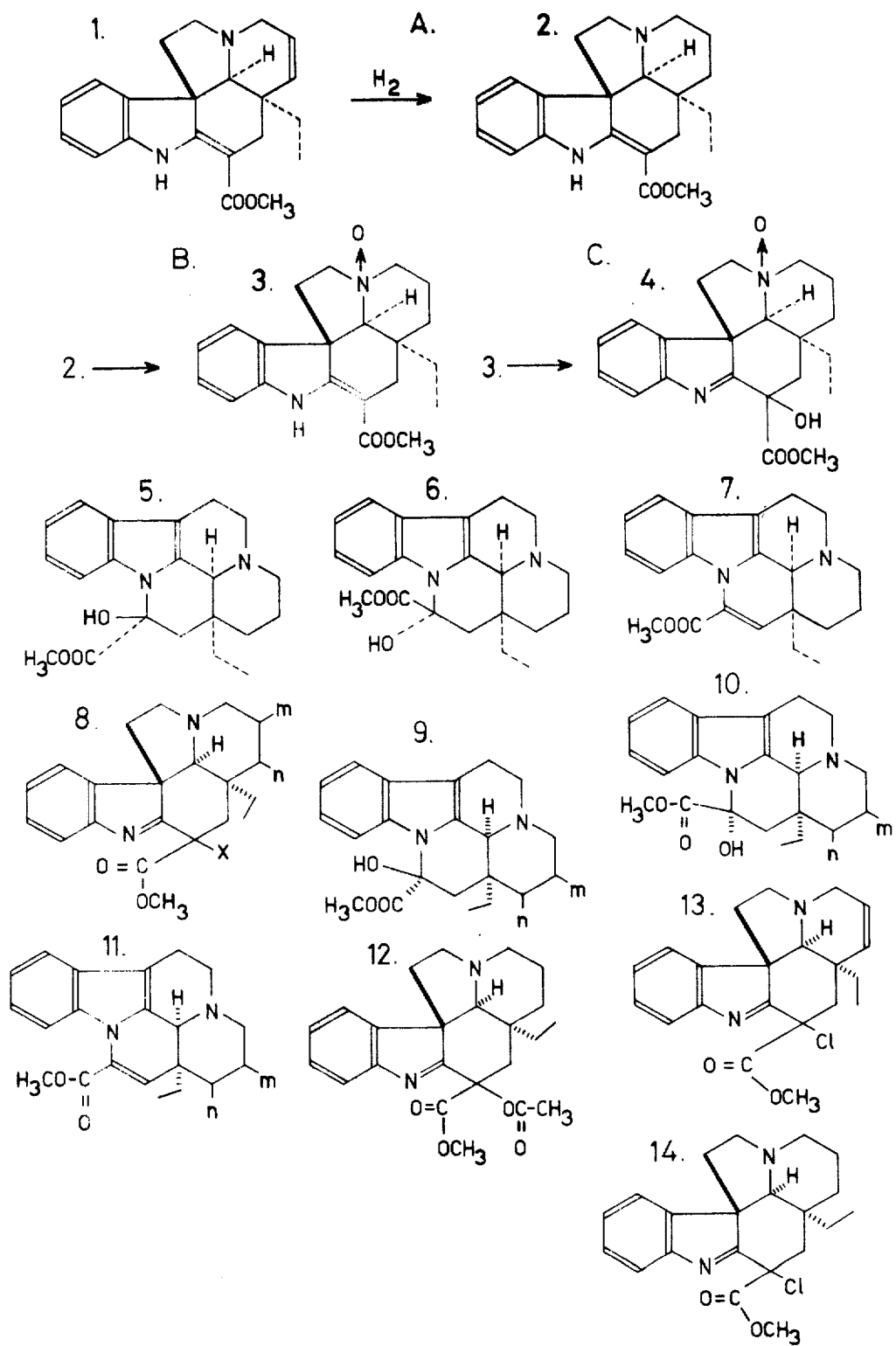

PROCESS OF PREPARATION OF VINCAMINE FROM TABERSONINE

This invention relates to a method for preparing vincamine, epi-16-vincamine, and apo-vincamine, and to certain noval indole derivatives which are useful intermediates in this method.

Throughout the rest of this specification, the reference numerals 1 to 14 appearing in brackets after the names of compounds are used to identify the respective formula of each compound as given in the accompanying sheet of formulae drawings.

As is known, vincamine (5) and epi-vincamine (6) are alkaloids which may be isolated from Vinca minor. When dehydrated in an acid medium, the two products give the same derivative, apo-vincamine (7).

Vincamine and derivatives thereof have important pharmacological properties for therapeutic use. Their application, however, is limited by the fact that Vinca minor contains little vincamine and very little epi-16-vincamine and that these two alkaloids, like apo-vincamine and other products derived therefrom, are expensive. There are several known methods of synthesising vincamine and derivatives thereof, but the methods give low yields and the products are racemic.

This invention is concerned with preparing vincamine epi-16-vincamine, and apo-vincamine in high yield by a method which is characterised as a multistage hemisynthesis from tabersonine (1). The tabersonine (1) starting material is preferably obtained from Voacanga grains, which contain a relatively large amount of this alkaloid, and advantageously by the method described in French Pat. No. 69 09,002 filed on Mar. 26, 1969, corresponding to U.S. Pat. No. 3,758,478 to Poisson.

Several alkaloids have been extracted from various Voacanga or African Apocynaceae, and especially *V. africana, thouarsii, bracteata, candiflora, glabra, obtusa* and the like. These alkaloids have been described and are well known. They are extracted from Voacanga trunk bark, roots or leaves.

The method described in French Pat. No. 69/09002 consists of using Voacanga seeds as the source of an alkaloid other than those isolated hitherto from this member of the Apocynaceae, namely tabersonine, the molecule of which, of indole structure, is related to that of Vinca alkaloids.

The empirical formula of this alkaloid is $C_{21}H_{24}N_2C_2ClH$ (Melting point 196° C).

This process can be characterized in that the extraction is effected successively by means of solvents possessing decreasing selectivity with regard to the amounts of nonalkaloid materials, fatty materials and other objectionable substances in the raw matter or vegetable starting material.

This succession of solvents makes it possible easily and gradually to remove substances which would have a very detrimental effect if they were present together in a single solvent of high extractive power.

The process for the extraction of tabersonine from Voacanga seeds, up to the isolation of the alkaloid, will be described below.

DESCRIPTION

Harvesting:

Vocanga seeds are harvested when the fruit has ripened or slightly before complete ripening, that is to say as soon as the fruit has reached its normal volume. It becomes difficult, in practice, to harvest the seeds after dehiscence of the fruit, although the alkaloid is still present at this stage.

In practice, the seeds are isolated and freed from foreign materials, fragments of pericarp or other vegetable debris which would constitute a useless charge which would be prejudicial to the good yield of the extraction process, or would form an objectionable source of chlorophyll during purification.

After the seeds have been sorted and well dried, they are ground until they are in the form of a fine powder.

Extraction:

The extraction of tatersonine from Voacanga seed powder possesses the advantage of an excellent yield, of the order of 20 g of total bases, consisting of 75 to 85 per cent of pure product, per kilogram.

The process makes use of known techniques but possesses characteristics which are inherent in the actual nature of tabersonine which is a weak base and a fragile molecule, as well as in the starting raw material which contains a high proportion of fatty material.

Operation 1:

The seed power is treated with peptroleum ether or carbon tetrachloride in an extraction apparatus such as a percolator, lixiviator or an apparatus of the Soxhlet type; the operation can be carried out under hot or cold conditions.

The solvent No. 1 thus obtained is washed with acidified water, for example a 2% strength aqueous solution of hydrochloric acid, a 5% strength aqueous solution of acetic acid or a 1% strength aqueous solution of sulphuric acid. The crystalline precipitate which appears during this washing process is filtered off.

The solvent phase is isolated by decanting and is recycled to treat a new batch of powder, whilst the acid phase is stored.

Operation 2:

The powder which has been treated with solvent No. 1 is then treated with diethyl ether and this solvent No. 2 is in its turn extracted by means of an aqueous solution of hydrochloric, acetic or sulphuric acid. The acid wash waters are stored.

Operation 3:

Finally, the powder is treated with ethanol acidified with 5% of acetic acid, until a negative Mayer reaction is obtained. The solvent No. 3 thus obtained is concentrated under reduced pressure in order to remove the alcohol from it, and then it is diluted with water; a precipitate of various objectionable constituents appears and is filtered off employing the usual acids, Kieselguhr or diatomaceous earth. The clear acid wash water thus obtained is isolated by decanting.

The acid wash waters from the three extraction solvents can be treated separately or after they have been combined; it is of no value, in industrial practice, to effect separate treatments, but it is possible to employ the so-called enrichment system.

Extraction can also be effected by means of conventional methods, that is to say it is possible to render the raw vegetable material in powder form alkaline by means of a solution of sodium carbonate or ammonia and to effect extraction using a Soxhlet apparatus or by lixiviation or by maceration followed by percolation, employing a solvent which is immiscible with water, such as benzene or diethyl ether or ethyl acetate or a chlorinated solvent like methylene chlorine or chloroform. The single solvent used in the extraction process is extracted with acidified water; the acid is either an organic acid such as acetic acid or tartaric acid, or an inorganic acid such as sulphuric acid; extraction by means of an aqueous solution of hydrochloric acid is more difficult because of the solubility of hydrochlorides in chlorinated solvents, but is suitable if a non-chlorinated solvent has been employed.

It is also possible to treat the raw vegetable material, which has been ground but not rendered alkaline, with acidified water, which may be either an aqueous solution of hydrochloric acid or an aqueous solution of acetic acid, and these aqueous solutions may or may not contain a certain proportion of ethanol or methanol, for example 10 to 20 percent.

Treatment of the acid wash waters:

The acid wash waters originating from any of the methods of extraction which have been described are filtered after the solvents have been removed therefrom in vacuo; they are washed with ether and decanted in a separating funnel or by means of a centrifuge or in a rotary apparatus for effecting liquid-liquid separation.

They are then rendered alkaline, in the presence of a non-miscible solvent, by means of ammonia or a solution of sodium carbonate.

These alkaline wash waters are extracted by means of the chosen solvent, which may be benzene, chloroform, methylene chloride or ethyl acetate, until they no longer give a positive Mayer reaction.

The solvent used in the extraction process is evaporated to dryness and leaves a residue of total bases representing 1.8 to 2.2% of the weight of raw vegetable material employed.

Purification:

The total bases are taken up in an amount of methanol containing hydrochloric acid in the proportion of 1 molecule (sic) of this acid per 340 g of bases.

The solution of hydrochlorides thus obtained is diluted with diethyl ether and this causes hydrochloride crystals to appear rapidly; the crystals are filterd off.

A second crystallization can be carried out by converting the product back to the base and by effecting a further treatment like that which has just been described.

The yield of base after it has been purified twice corresponds to approximately 75% of the weight of total bases, corresponding to 1.4 to 1.55% of the weight of raw starting material.

According to the invention, in a first step tabersonine (1) is catalytically hydrogenated to given an almost quantitative yield of (−) vincadifformine or 14,15-dihydro tabersonine (2).

In a second step, (−) vincadifformine (2) is reacted rapidly with an equimolecular quantity of a peroxide and coverted to (−) N-oxy vincadifformine (3).

In a third step (−) N-oxy vincadifformine (3) is treated, in a similar manner to the second step, with an equimolecular quantity of a peroxide (which may or may not be the same as that used in the second step) so as to obtain (−) 1,2-dehydro-16-carbomethoxy-16-hydroxy-N-oxy-aspidospermidine (4).

Finally, in a fourth step, compound (4) is treated in a acid medium with an equimolecular quantity of an agent capable of reducing the N-oxide group (typically this agent is triphenylphosphine). The resulting rearrangement gives a mixture of (−) vincamine (5), epi-16-vincamine (6) and apo-vincamine (7).

The resulting mixture of compounds (5), (6) and (7) may be separated into fractions by chromatography. The more polar fraction consists mainly of vincamine, together with some epi-vincamine, which can be separated by crystallisation. The less polar fraction can be crystallised to give apo-vincamine. Alternatively, compounds (5), (6) and (7) may be separated by fractional crystallisation without the need for a chromatographic separation.

In one embodiment of the invention, (−) 1,2-dehydro 16-carbomethoxy-16-hydroxy-N-oxy-aspidospermidine (4) can be obtained directly from compound (2) without isolating the N-oxy vincadifformine intermediate (3) by prolonged treatment of one molecule of (−) vincadifformine (2) with 2 molecules of a peroxide.

A more detailed description will now be given of a preferred method of performing the various steps according to the invention:

In the first step, (−) tabersonine (1) is dissolved in an alcohol and hydrogenated at atmospheric pressure in the presence of $PtO_2$, Pd/C or Pt/C catalyst until the theoretical volume of hydrogen has been absorbed, (calculated for the formation of compound (2)). The catalyst is separated from the solution by filtration through diatomaceous earth. The solution is evaporated in vacuo and the residue is crystallised from a mixture of methanol and ether. The crystal product has a M.P. of 96°C and $(\alpha)D = -600°$ (ethanol).

In the second step, (−) vincadifformine (2) is treated for approximately five hours with an equimolecular quantity of a peracid at room temperature under nitrogen, in darkness, in a solvent which does not mix with water, e.g. an aromatic solvent such as benzene or toluene, an ether, or an aliphatic chlorinated hydrocarbon derived from methane or ethane such as methylene chloride, carbon tetrachloride, chloroform, trichloroethylene or tetrachloroethane.

The reaction solution is washed with an aqueous alkali in order to remove most of the peroxidising agent and the conversion products thereof, and is then distilled to give a residue comprising (−) N-oxy vincadifformine (3), the yield being approximately 90 %. The residue can be converted directly into compound (4) or can first be purified by crystallisation from a mixture of light solvents. Compound (3) had the following properties on analysis:

M.P. 160°C (decomposition)

$(\alpha)_D = 213$ (C = 1 methanol)

U.V. (methanol max at λ log ε: 228 (3.99) 297 (3.99) and 331 (4.11) nm.

I.R. bands (conjugate ester) at 1670 and 1610 $cm^{-1}$

Mass Spectrum: molecular peak $M^+$ at m/e 354

Analysis: $C_{21}H_{26}O_3N_2$. Calculated: C 71.16 % H 7.39 %. Found: C 70.9 % H 7.3 %

In the third step, (−) N-oxy vincadifformine (3) is treated with an equimolecular quantity of a peracid as in the second step but for between one and five days, so as to obtain an approximately 80 % yield of (−) 1,2-dehydro-16-carbomethoxy-16-hydroxy-N-oxy-aspidospermidine (4) which can be purified by crystallisation from a light solvent or used in crude form in the fourth step of the operation. Compound (4) had the following properties on analysis:

M.P. 178° – 180°C (decomposition)
$(\alpha)D = -107°$ (C = 1 methanol)
U.V. (methanol) max at $\lambda$ log $\epsilon$: 223 (4.29), 270 (3.73) nm.
I.R. (non-conjugate carbonyl ester) 1738 cm$^{-1}$
Mass spectrum: molecular peak M$^+$ at m/e 370
Analysis: $C_{21}H_{26}O_4N_2$. Calculated: C 68.09 % H 7.07 %. Found: C 67.9 % H 7.0 %.

The peracids used in the second and third steps may be the same or different. The following are typically used: peracetic acid, perbenzoic acid, metachloroperbenzoic acid, paranitroperbenzoic acid, trifluoroperacetic acid, performic acid, or perphthalic acid.

The intermediate (3) need not be isolated, but in that case (–) vincadifformine (2) must be treated with a double quantity of peracid under the aforementioned conditions for between one and five days, giving an approximately 85 % yield of product (4).

In the fourth step, the intermediate (4) and an equimolecular quantity of triphenylphosphine, which reduces the N-oxide group, are dissolved in a liquid organic acid of low molecular weight, perferably acetic acid.

After boiling under nitrogen for approximately one or two hours, the solution is cooled, diluted with an equal quantity of water and washed with double quantity of benzene or ether so as to remove the triphenylphosphine oxide formed, whereupon the light organic phase is removed by decantation, the acid aqueous phase is made alkaline to pH 10 and extracted with an organic solvent such as methylene chloride, chloroform, ether or benzene, and the organic phase is decanted, washed with pure water, dried over a dehydrating agent such as sodium sulphate and finally distilled to eliminate the solvent. The residue thus obtained (with a yield of approx. 85 %) consists of a mixture of vincamine (5), epi-16-vincamine (6) and apo-vincamine (7).

In order to obtain each of the aforementioned products, the crude residue obtained from the preceding reaction is dissolved in 10 parts of benzene and chromatographed on a column containing thirty parts of alumina. Elution is successively performed with benzene, and 80-20 benzene/ether mixture, and pure ether. The three fractions, when crystallised from acetone, respectively give apo-vincamine (7), vincamine (5) and epi-16-vincamine (6) in the proportions of approx. 25, 50 and 25 % respectively.

If the fourth step is performed in the cold for about ten hours in an aqueous acetic (e.g. 10 %) medium, instead of for about 1 or 2 hours at boiling-point as described hereinbefore, an approximately 85 % yield is obtained of a crude product which contains very little apovincamine (7) and essentially comprises vincamine (5) and epi-16-vincamine (6) in the proportions of 3:1. The vincamine can be isolated from the aforementioned mixture by crystallisation twice from acetone, methanol, ethanol or propanol.

The invention also relates to oxidation derivatives of (–) vincadifformine (2) and (–) tabersonine (1) as represented by compound (8) on the sheet of formulae drawings wherein X is a. a hydroxyl group —OH (compound 8a),
b. an alkoxy or aryloxy group —OR (compound 8b),
c. an acyl group —OCOR (compound 8c), or
d. a halogen atom (compound 8d), and wherein $m$ and $n$ each represent a hydrogen atom or together represent a double bond.

The compounds (8a) to (8d) may be used as intermediates in the formation of compound (9), (10) and (11). When $m = n$ = hydrogen atom, compounds (9), (10) and (11) are, respectively, vincamine (5), epi-16-vincamine (6) and apo-vincamine (7).

The preparation of the various compounds (8) from (–) tabersonine (1) and (–) vincadifformine (2) will now be described in greater detail. The derivatives (8a) with X = OH are obtained by the action of oxygen in the presence of a catalyst such as PtO$_2$; the derivatives (8b) with X = OR are obtained by the action of an alkyl peroxide; the derivatives (8c) with X = OCOR' are obtained by the action of the salt of a highly-oxidised heavy metal, e.g. lead tetra-acetate; and the derivatives (8d) with X = halogen are obtained by the action of an anion resulting from the combination of the appropriate halogen with oxygen; the anion can be in a mineral or organic compound.

The various compounds (8a) to (8d) and compound (4) can be converted into one another. Selective reduction of the N-oxy group of compound (4) leads to compound (8a), and guided hydrolysis of compound (8d) with a heavy-metal salt gives compound (8c).

The aforementioned compounds (8) may be rearranged in an acid medium to give a mixture of the products (9), (10) and (11).

The invention will be more fully understood from the following Examples, given by way of illustration only.

EXAMPLE 1

Preparation of (–) vincadifformine (2) from tabersonine (1).

A continuously agitated suspension of 200 g Adams platinum oxide in 10 litres of methanol was saturated with hydrogen at room temperature and atmospheric pressure for one hour. A solution of 1 kg of tabersonine base in 10 litres of methanol was rapidly added and agitation was continued. The theoretical quantity of hydrogen (calculated for conversion of compound (1) to (2)) was absorbed after 6 hours. The catalyst was then removed by filtration on kieselguhr and the filtrate was distilled to dryness, giving 985 g of the hydrogenated derivative (2) in the form of a translucent lacquer which, after recrystallisation from a methanol-ether mixture, gave (–) vincadifformine (2), M.P. 96°C, $(\alpha)_D = -600°$ (ethanol).

EXAMPLE 2

Preparation of (–) N-oxy vincadifformine (3) from (–) vincadifformine (2).

A solution of 1300 g of (–) vincadifformine (2) and 800 g paranitroperbenzoic acid in 200 litres of dry benzene was kept in darkness under nitrogen. After the solution had remained under the aforementioned conditions for four hours, a sample was tested by chromatography on a thin layer of silica gel (eluent: benzene 50, methanol 39, ether 10, ammonia 1), showing the complete disappearance of the original blue spot given by (–) vincadifformine with the ammoniacal ceric sulphate-based reagent and its replacement by another blue spot having a considerably lower R$_f$ value. The benzene solution was then washed with a solution of sodium bicarbonate and water. The benzene solution was dried and the solvent was distilled off, giving 1380 g (a 90 % yield) of a thick oil which, when crystallised from a mixture of methylene chloride and ether, gave (−) N-oxy vincadifformine (3), M.P. 160°C.

EXAMPLE 3

Preparation of (−) 1,2-dehydro 16-carbomethoxy 16-hydroxy N-oxy aspidospermidine (4) from (3).

A solution of 1410 g (−) N-oxy vincadifformine (3) and 800 g paranitroperbenzoic acid in 200 litres of dry benzene was left in darkness under nitrogen. After the solution had been left in the aforementioned conditions for four days, a sample was tested by thin-layer chromatography showing the complete disappearance of the original blue spot given by (−) N-oxy vincadifformine with the ammoniacal ceric sulphate-based reagent and its replacement by a product which was not shown by the aforementioned reagent but which gave a brown spot with Dragendorff's reagent. The reaction solution was then treated as in the preceding Example. The final product was 1320 g(an 89 % yield) of a thick oil which, when crystallised from a mixture of methylene chloride and ether, gave the product (4) in crystal form, M.P. 178° − 180°C with decomposition.

EXAMPLE 4

Preparation of (−) 1,2 dehydro 16-carbomethoxy 16-hydroxy N-oxy aspidospermidine (4) from (2).

A solution of 1360 g of (−) vincadifformine (2) and 1600 g paranitroperbenzoic acid in 200 litres of dry benzene was left in darkness under nitrogen for five hours. At this stage, a thin-layer chromatography test showed that the initial product (2) and the intermediate (3) had disappeared and been replaced by (4). The reaction solution was treated as the preceding two Examples and 1250 g of derivative (4) was isolated. The yield was 84 %.

The same reaction, when performed in dry methylene chloride instead of benzene, gave an 80 % yield of the same derivative (4).

EXAMPLE 5

Preparation of vincamine (5), epi-16-vincamine (6) and apo-vincamine (7) from (4) by rearrangement.

A solution of 1110 g of compound (4) and 780 g of triphenylphosphine in 100 litres of pure acetic acid was refluxed for two hours. The reaction solution was diluted with an equal volume of iced water and washed with 50 litres of benzene, thus removing 820 g of triphenylphosphine oxide. The solution was then made alkaline was sodium bicarbonate and extracted twice with 50 litres of methylene chloride. The methylene chloride solutions were washed with water, dried, and distilled, giving 950 g (an 86 % yield) of an oily residue. Analysis by thin-layer chromatography, using Dragendorff's reagent, showed that the oily residue had three constituents having the same $R_f$ value as apo-vincamine and epi-16-vincamine, in order of decreasing $R_f$ values. The oily residue, when dissolved in 10 litres of benzene, was chromatographed on a column of 30 kg alumina. Successive elution with benzene, a 20 % benzene-ether mixture and pure ether gave three fractions which, when crystallized from acetone, gave three pure products, which were identified by their physical constants (F, (α)D, U.V., I.R., mass spectrum) using reference samples. The three products where: apo-vincamine (7) (120 g), vincamine (5) (330 g) and epi-16-vincamine (6) (150 g). The same reaction between (4) and triphenylphosphine in acetic acid, using the same proportions but at room temperature for 12 hours, gave an 85 % yield of a crude mixture containing only traces of apovincamine and mainly comprising vincamine (5) (3 parts) and epi-16-vincamine (6) (1 part).

EXAMPLE 6

Preparation of (−) 1,2-dehydro-16-carbomethoxy-16-acetoxy-aspidospermidine (12).

A solution of 0.494 g (1.1 millimol) of lead tetraacetate in 10 ml anhydrous methylene chloride was rapidly added under nitrogen to a solution of 0.68 g (2 millimols) of (−) vincadifformine (2) in 50 ml anhydrous methylene chloride, and the mixture was kept, under agitation, at a temperature between −10° and +5°C. Agitation was continued until a sample taken from the reaction medium did not immediately turn wet starch iodine paper blue. At this stage, the precipitate was eliminated by filtration. The filtrate was washed with water, dried over magnesium sulphate and distilled till dry, giving 0.46 g of a residue which, when crystallised from ethyl acetate, gave 0.28 g (a 57 % yield) of (−) 1,2-dehydro-16-carbomethoxy-16-acetoxy-aspidospermidine (12). This product had the following properties on analysis:

M.P. 175°–180°C (decomposition)
λ max. 225 and 275 nm
I.R. spectrum; C=O and bands at 1750 cm$^{-1}$; 1260 cm$^{-1}$
Mass spectrum calculated for $C_{23}H_{28}O_4N_2$:
Calculated: 396 Found M$^+$ = 396

| Analysis: | C % | H % |
|---|---|---|
| Calculated for $C_{23}H_{28}O_4N_2$ | 69.67 | 7.12 |
| Found | 69.6 | 7.0 |

EXAMPLE 7

Preparation of (−) 1,2,14,15-tetradehydro-16-carbomethoxy-16-chloro-aspidospermidine (13).

11.8 ml of a 6 % solution of tertiary butyl hypochlorite (p/v) in methylene chloride was added to a solution of 1.327 g of tabersonine base in 38 ml methylene chloride and 0.6 ml of freshly distilled triethylamine, the solution having been maintained at −16°C with agitation.

Agitation at −16°C was continued for 30 minutes, after which 200 ml of iced water was added to the reaction mixture. The methylene chloride was separated by decantation and the aqueous phase was again extracted with 150 ml of methylene chloride in two portions. The combined organic phases were washed with distilled water, dried over magnesium sulphate and evaporated in vacuo, giving a residue weighing 1.417 g.

Successive crystallisation from acetone and ether gave 1.12 g (an 82 % yield) of colourless crystals of: (−) 1,2,14,15-tetradehydro-16-carbomethoxy-16-chloro-aspidospermidine (13). This product had the following properties on analysis:

M.P. = 182° − 185°C (decomposition)
$(\alpha)_D^{26}$ = −201° (CHCl$_3$, c = 1.448 g%)

U.V. Spectrum: λ max nm (log ε) 215 (4.08) (ep): 228 (4.26) 284 (3.85)

I.R. spectrum: KBr band at 1735 cm$^{-1}$

Mass spectrum: M$^+$ calculated for $C_{21}H_{23}O_2N_2Cl$ = 370 Found = 37, 372

| Analysis: | C % | H % | O % | N % | Cl % |
|---|---|---|---|---|---|
| Calculated for $C_{21}H_{23}O_2N_2Cl$: | 68.00 | 6.24 | 8.67 | 7.53 | 9.56 |
| Found | 67.7 | 6.3 | 8.4 | 7.8 | 9.8 |

EXAMPLE 8

Preparation of (−) 1,2-dehydro-16-carbomethoxy-16-chloro-aspidospermidine (14).

A solution of 1.0 g of (−) vincadifformine (2) in 29 ml methylene chloride and containing 0.45 ml of freshly-distilled triethylamine was continuously agitated at −16°C. 9 ml of a 6 % solution of tertiary butyl hypochlorite (p/v) in methylene chloride was then added dropwise for 15 minutes. Agitation at the aforementioned temperature was continued for 30 minutes, after which 200 ml of iced water was added. The methylene chloride was separated by decantation and the aqueous phase was extracted with 150 ml of methylene chloride in two portions. The organic phases were washed, dried and evaporated in vacuo.

The residue, which weighed 1.093 g, was chromatographed on silica. The less polar fraction provided 761 mg (crude yield = 69 %) of a colourless lacquer which, when crystallised from ether, provided 571 mg of crystals of: (−) 1,2-dehydro-16-carbomethoxy-16-chloro aspidospermidine (14). This product had the following properties on analysis:

M.P. 133°C $(\alpha)_D^{27}$ = 254° (CHCl$_3$, c = 1.545 g%)

U.V. spectrum: λ max. nm (log ε) 229 (4.38); 285 (3.89)

I.R. spectrum: Bands at 1740 cm$^{-1}$ (solution in CHCL$_3$); 1730 and 1755 cm$^{-1}$ (KBr disc)

Mass spectrum: M$^+$ calculated for $C_{21}H_{25}O_2N_2Cl$ = 372; 374

Found: 372; 374

| Analysis: | C % | H % | O % | N % | Cl % |
|---|---|---|---|---|---|
| Calculated for $C_{21}H_{25}O_2N_2Cl$ | 67.98 | 6.29 | 8.6 | 7.52 | 9.55 |
| Found: | 67.8 | 6.2 | 8.5 | 7.7 | 9.8 |

EXAMPLE 9

Preparation of 1,2-dehydro-16-carbomethoxy-16-acetoxy-aspidospermidine (12) from 1,2-dehydro-16-carbomethoxy-16-chloro-aspidospermidine (14).

One g of finely-divided silver acetate was added to a solution of 200 mg of 1,2-dehydro-16-carbomethoxy-16-chloro-aspidospermidine (12) in 50 ml methylene chloride, and the mixture was vigorously agitated at a temperature below 10°C under nitrogen for 16 hours. The solid in suspension was filtered and the methylene chloride was washed in water, dried over magnesium sulphate and evaporated to dryness, giving 185 mg of a residue which, when chromatographed on silica, gave a fraction which was crystallised from ethyl acetate, thus isolating 27 mg of a product which was identical in all respects with 1,2-dehydro-16-carbomethoxy-16-acetoxy-aspidospermidine (12) as descirbed in Example 6 hereinbefore.

EXAMPLE 10

Conversion of (−) 1,2-dehydro-16-carbomethoxy-16-acetoxy-aspidospermidine (12) to vincamine (9), epi-16-vincamine (10) and apo-vincamine (11).

One ml of trifluoroacetic acid was added to a solution of 2 g of (−) 1,2-dehydro-16-carbomethoxy-16-acetoxy aspidospermidine (12) in 60 ml methylene chloride saturated with water, and the mixture was kept for 6 days at 20°C. Next, the mixture was mixed with iced water and made alkaline with sodium carbonate, and methylene chloride was separated. Extraction was continued with two 30 ml proportions of methylene chloride, after with the organic phases were collected, washed with water, dried over magnesium sulphate and evaporated to dryness, giving an oily residue weighing 1.75 g. The residue, when treated as in Example 5 hereinbefore, gave three pure products which were identified from their physical constants (F $(\alpha)_D$, U.V., I.R. mass spectrum) using reference samples, as follows: apo-vincamine (11) (0.32 g) ($m=n=$H), vincamine (9) ($m=n=$H) (0.58 g) and epi-16 vincamine (10) ($m=n=$H) (0.27 g).

What I claim is:

1. The method for producing (−)-vincamine) which comprises the sequential steps of:
   a. catalytically hydrogenating (−)-tabersonine for a time at least sufficient for producing (−)-vincadifformine in the presence of a catalyst selected from the group consisting of PtO$_2$, Pt/C, and Pd/C;
   b. oxidizing the vincadifformine of step (a) with a peracid selected from the group consisting of peracetic acid, perbenzoic acid, metachlororbenzoic acid, paranitroperbenzoic acid, performic acid, perphthalic acid, and mixtures thereof; under nitrogen, in darkness, and in the presence of a water-immiscible solvent selected from the group consisting of aromatic solvents, ether and aliphatic chlorinated hydrocarbons; for a time at least sufficient for producing (−)-1,2-dehydro-16-carbomethoxy-16-hydroxy-N-oxyaspidospermidine;
   c. reducing the (−)-1,2-dehydro-16-carbomethoxy-16-hydroxy-N-oxyaspidospermidine of step (b) in the presence of acetic acid with triphenylphosphine for a time at least sufficient for forming a product comprising a mixture of:
      1. (−)-vincamine,
      2. epi-16-vincamine, and
      3. apo-vincamine, and
   d. isolating (−)-vincamine from the mixture by crystallization from a member selected from the group of acetone, methanol, ethanol and propanol or by chromatography with aluminum-oxide and crystallization from acetone.

2. The process of claim 1 which further comprises dissolving the (−) tabersonine in alcohol and then catalytically hydrogenating the (−) tabersonine until the theoretical volume of hydrogen has been absorbed; carrying out the oxidizing step (b) by treating the (−) vincadifformine resulting from step (a) with an equal molar quantity of a peracid for about 5 hours to produce (−) N-oxy-vincadifformine and then treating the (−) N-oxy-vincadifformine with a peracid for between 1 and 5 days to produce the (−) 1,2 - dehydro-16-carbomethoxy-16-hydroxy-N-oxy-aspidospermidine.

3. The process of claim 1 wherein the oxidizing step (b) includes treating one molecule of (−) vincadifformine with two molecules of a peroxide to form the (−) 1,2- dehydro-16-carbomethoxy-16-hydroxy-N-oxy-aspidospermidine.

4. The process of claim 1 wherein the oxidizing step (b) is carried out by first treating the vincadifformine with an equal molecular quantity of a peracid so as to form (−) N-oxy-vincadifformine and then treating the (−) N-oxy-vincadifformine with an equal molecular quantity of a peracid to obtain the (−) dehydro-1,2-carbomethoxy-16-hydroxy-16N-oxyaspidospermidine.

5. The process of claim 4 wherein the product mixture of step (c) is separated by chromatography into two fractions wherein the more polar fraction consists mainly of (−) vincamine and to a lesser extent of epi-16-vincamine which is separated by crystallization and wherein the less polar fraction is crystallized to give apo-vincamine.

6. The process of claim 4 wherein the products of step (c) are separated into fractions by repeated crystallization and without chromatography.

7. The process of claim 1 wherein said solvent is selected from the group of benzene, toluene, ether aliphatic chlorinated hydrocarbons derived from methane or ethane, methylene chloride, carbon tetrachloride, chloroform, trichloroethylene and tetrachloroethane.

8. The method of claim 1 which comprises oxidizing the (−) vincadifformine by treating with a double quantity of peracid molecules for between 1 and 5 days at room temperature in a water immiscible solvent in order to obtain an approximately 85% yield of (−) 1,2-dehydro-16-carbomethoxy-16-hydroxy-N-oxy-aspidospermidine.

9. The method of claim 8 wherein said solvent is selected from the group of benzene, toluene, ether, and aliphatic chlorinated hydrocarbon derived from methane or ethane, methylene chloride, carbon tetrachloride, chloroform, trichloroethylene, and tetrachloroethane.

10. The process of claim 1 which comprises reducing the (−) 1,2-dehydro-16-carbomethoxy-16-hydroxy-N-oxyaspidospermidine by boiling under nitrogen for 1 to 2 hours with an equimolecular quantity of triphenylphosphine, cooling the solution, diluting the solution with an equal quantity of water, washing with a double quantity of benzene or ether so as to remove the triphenylphosphine oxide formed, removing the light organic phase by decantation, rendering the acid aqueous phase alkaline to a pH of 10, and extracting with an organic solvent selected from the group of methylene chloride, chloroform, ether and benzene, decanting the organic phase, washing with water, drying over a dehydrating agent and distilling to eliminate the solvent.

11. The method of claim 8 wherein said dehydrating agent is sodium sulphate.

12. The method of claim 1 which comprises reducing the (−) 1,2-dehydro-16-carbomethoxy-16-hydroxy-N-oxyaspidospermidine at room temperature for about 10 hours in an aqueous acetic acid medium with an equimolecular quantity of triphenylphosphine to produce a product of about 85% yield which contains very little apo-vincamine and essentially comprises a mixture of (−) vincamine and epi-16 vincamine in the proportions of three parts to one part by weight of the mixture, isolating the (−) vincamine from the mixture by double crystallization from a member selected from the group of acetone, methanol, ethanol, and propanol.

13. The method of claim 1 wherein said alkaline aqueous solution is selected from the group consisting of aqueous solution of sodium carbonate and aqueous solution of sodium bicarbonate.

14. The process of claim 1 which further comprises dissolving (−)-tabersonine in an alcohol, catalytically hydrogenating the (−)-tabersonine at atmospheric presure in the presence of a catalyst selected from the group of $PtO_2$, Pd/C, and Pt/C until the theoretical volume of hydrogen has been absorbed, and thereafter separating the catalyst from the solution by filtration, distilling the filtrate to remove solvent, and to dry said filtrate and then recrystallizing the filtrate.

15. The process of claim 4 which comprises oxidizing the vincadifformine with an equal molecular quantity of a peracid at room temperature for about 5 hours in the presence of said water-immiscible solvent, washing the reaction solution with an alkaline aqueous solution to remove most of the peroxidizing agent and the conversion products thereof, and then distilling the reaction solution to remove the solvent and to give an oil comprising (−)-N-oxy-vincadifformine, the yield being apporoximately 90% and then treating the oil with an equal molecular quantity of a peracid selected from the group consisting of peracetic acid, perbenzoic acid, metachloroperbenzoic acid, paranitroperbenzoic acid, performic acid, perphthalic acid, and mixtures thereof, for between 1 and 5 days so as to obtain an approximately 80% yield of (−)-1,2-dehydro-16-carbomethoxy-16-hydroxy-N-oxy-aspidospermidine, and then purifying said aspidospermidine by crystallization from a volatile solvent.

* * * * *